Figure 1:
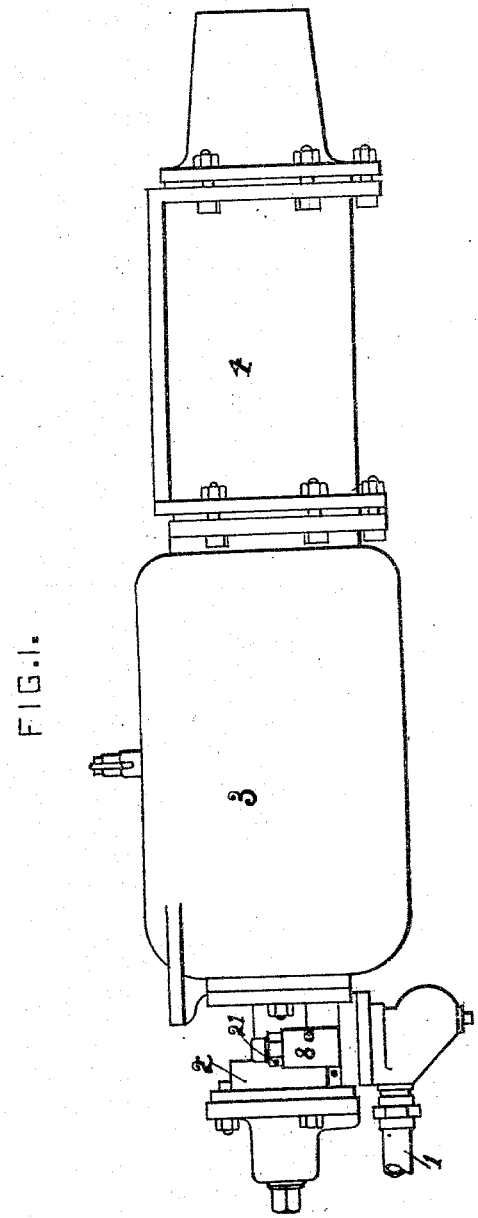

(No Model.)

3 Sheets—Sheet 1.

W. HIRST.
QUICK ACTION TRIPLE VALVE.

No. 563,766.

Patented July 14, 1896.

WITNESSES

INVENTOR
William Hirst

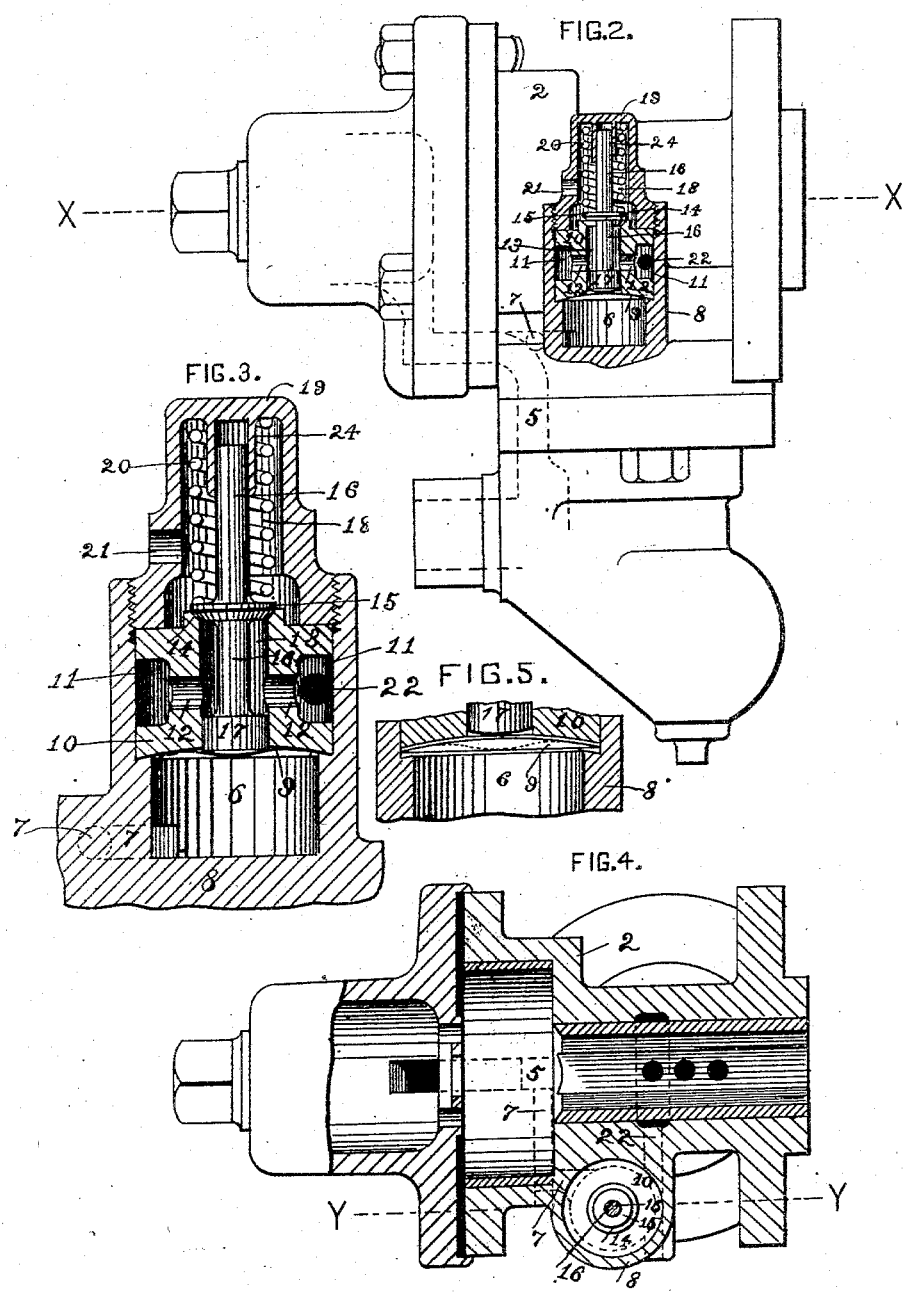

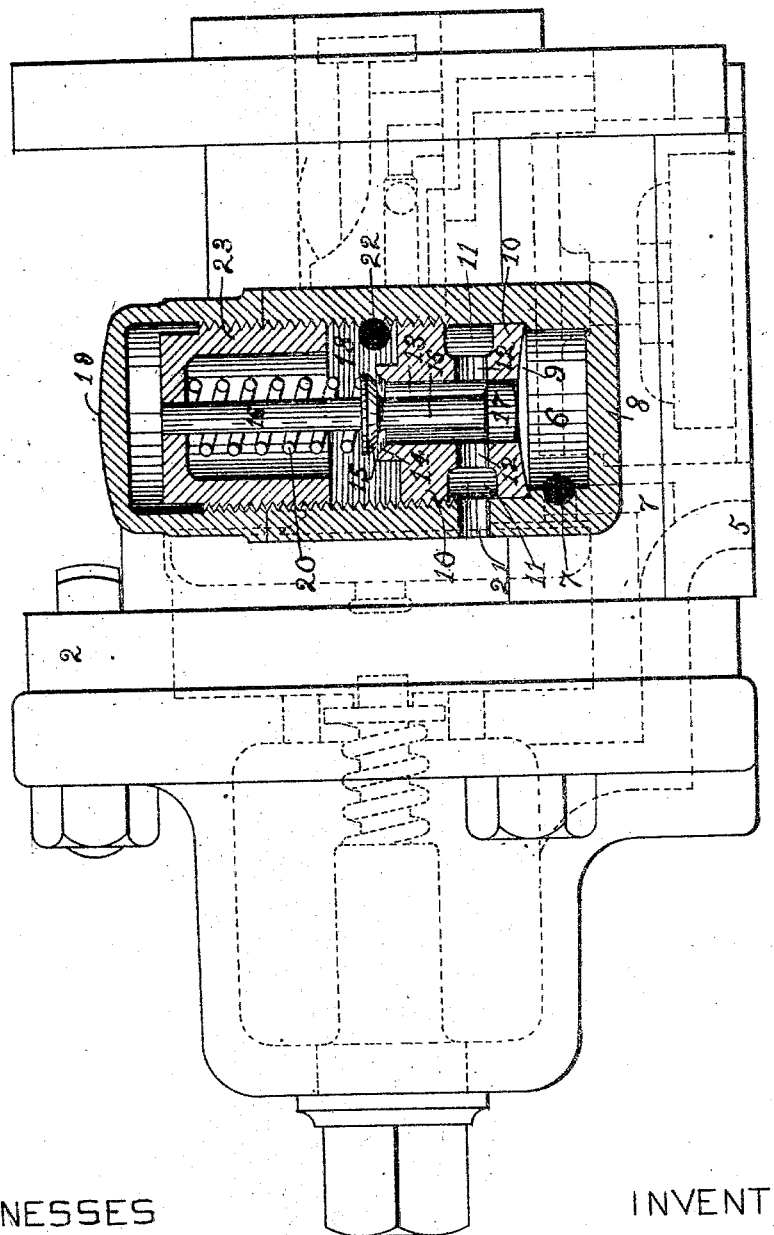

UNITED STATES PATENT OFFICE.

WILLIAM HIRST, OF TRENTON, NEW JERSEY.

QUICK-ACTION TRIPLE VALVE.

SPECIFICATION forming part of Letters Patent No. 563,766, dated July 14, 1896.

Application filed February 29, 1896. Serial No. 581,203. (No model.)

*To all whom it may concern:*

Be it known that I, WILLIAM HIRST, a citizen of the United States, residing at Trenton, in the county of Mercer and State of New Jersey, have invented certain new and useful Improvements in Quick-Action Triple Valves, of which improvement the following specification is a full and clear description.

The object of my invention is to provide an improvement in the construction of triple valves in automatic fluid-pressure brake systems, whereby under certain conditions of service the fluid under pressure in the brake-cylinder is retained.

My improvement relates, particularly, to the form of retaining-valve shown and described in the Letters Patent granted me, dated August 27, 1895, and numbered 545,289, which covers certain improvements in pressure-retaining valves by which, under certain conditions, the exhaust of fluid under pressure from the brake-cylinder is prevented, and which provides means whereby additional pressure may be supplied to the brake-cylinder from the auxiliary reservoir while the latter is being recharged during prolonged applications of the brakes.

In the subject-matter set forth in the above-mentioned Letters Patent the retaining-valve is opened by a piston, which is necessarily closely fitted in the chamber in which it moves, to prevent leakage. It has been found that owing to the presence in all brake apparatus of dirt and sticky matter the piston cannot be relied upon to work; therefore, I have provided improved means to open the retaining-valve without using such closely-fitted sliding surfaces, and have also adapted my improvement to coöperate with the non-automatic pressure-retaining valves in general use. To this end I substitute in the place of the piston a flexible diaphragm of peculiar form, and have limited the function of the retaining-valve to closing the exhaust-port of the triple valve, and for economy and compactness I form the retaining-valve casing integrally with that of the triple valve.

To clearly understand my invention and its operation, a brief explanation of the working of triple valve will be useful.

The local equipment of the brake apparatus consists of a section of the train-pipe, a triple valve, an auxiliary reservoir, and brake-cylinder. The motive force of the brake mechanism passes into the triple valve from the train-pipe and moves the triple valve into the release position, which is also the position in which the auxiliary reservoir is charged. The pressures in the train-pipe and auxiliary reservoir are normally equal, and are charged to a pressure of seventy pounds per square inch. Ordinary service applications of the brakes are made by causing a slight reduction of from two to five pounds in the train-pipe. This destroys the equilibrium of the pressures, and the preponderance being on the auxiliary reservoir side of the triple-valve piston causes it to move backward into the position to apply the brakes. Communication between the train-pipe and auxiliary reservoir is then cut off and a passage opened between the auxiliary reservoir and the brake-cylinder. Pressure then flows from the auxiliary reservoir into the brake-cylinder, until the pressure in the former falls by expansion into the latter, slightly below that in the train-pipe. This moves the triple-valve piston forward sufficiently to close the graduating-valve, which closes the passage from the auxiliary reservoir to the brake-cylinder.

If it is desired to increase the pressure in the brake-cylinder, another similar reduction of pressure in the train-pipe is made.

To release the brakes the maximum train-pipe pressure is restored, which moves the triple valve into the release position and allows the fluid under pressure in the brake-cylinder to pass out into the atmosphere.

It will be seen by the foregoing that the auxiliary reservoir cannot be recharged without releasing the brakes, unless the exhaust of the fluid under pressure in the brake-cylinder is prevented by some means outside of the triple valve. Hence when it is necessary to recharge the auxiliary reservoir without releasing the brakes, the exhaust of pressure from the brake-cylinder must be prevented. I attain this object by the improved pressure-retaining valve illustrated in the accompanying drawings, in which—

Figure 1 is a side elevation of the local brake apparatus provided with my improvement. Fig. 2 is a vertical section on the plane indicated by the line *y y* of Fig. 4. Fig. 3 is an enlarged sectional elevation with the valve in a different position, taken on the same plane as Fig. 2. Fig. 4 is a plan of the triple-valve casing with the piston and main valve removed, showing the location of my improvement, the plane of which is indicated by the line x x of Fig. 2. Fig. 5 is a broken sectional elevation of certain parts which are slightly separated. Fig. 6 is a side elevation of the upper part of the triple-valve body with the retaining-valve in section, showing a different arrangement of the ports.

The train-pipe 1 is connected to the triple-valve casing 2, which is bolted to the auxiliary reservoir 3 and the latter to the brake-cylinder 4. The passage 5 in the triple valve (shown by the dotted lines in Figs. 2 and 6) is in open communication with the train-pipe 1, and also with the chamber 6, through the port 7. The casing 8 of the retaining-valve is formed integrally with that of the triple valve 2. In the lower part of the casing 8 is the chamber 6. One of the walls of the chamber 6 is formed by the flexible diaphragm 9, the edge of which is held firmly between the counterbore in the casing 8 and the bushing 10. In the circumference of the bushing 10 is the annular groove or channel 11, from which the ports 12 lead to the chamber 13. In the opening of the chamber 13 on the upper side of the bushing 10 is formed the valve-seat 14. The valve 15 is formed on the stem 16, which passes through the chamber 13 and terminates in the abutment 17 on its lower end. The abutment 17 is made to fill that part of the chamber 13 below the ports 12, to prevent dirt from accumulating between the diaphragm 9 and the bushing 10. The abutment 17 is rounded to conform to the shape of the diaphragm when depressed. The upper end of the valve-stem 16 above the valve 15 slides in the sleeve 24, which is formed on the inside of the cap 19 in the chamber 18. Around the valve-stem 16 is coiled the spring 20, which is of sufficient strength to close the valve 15 against a predetermined pressure on the diaphragm 9.

The opening in the casing 8 is threaded, and in the construction shown in Figs. 2 and 3 the cap 19 is screwed tightly down on the bushing 10. The chamber 18 in the interior of the cap is open to the atmosphere through the port 21.

The port 22 is the exhaust-port of the triple valve, through which the fluid under pressure from the brake-cylinder is released into the retaining-valve. In Figs. 2, 3, and 4 this port 22 enters the casing 8 opposite the annular channel 11.

In the construction shown in Fig. 6 the retaining-valve casing 8 is lengthened and the bushing 10 is screwed in, the outside of the valve-seat 14 being squared for that purpose. Above the bushing 10 is the screw-plug 23, for adjusting the tension of the spring 20. The exhaust-port 22 enters the chamber 18 between the screw-plug 23 and the bushing 10. The outlet-port 21 in this construction is opposite the annular channel 11 in the bushing 10.

By Figs. 2 and 3 it will be seen that any pressure that may enter chamber 13 from the brake-cylinder will leak past the abutment 17, between the upper side of the diaphragm 9 and the bushing 10. The effect of this is to retard the opening of the retaining-valve to the extent of the pressure in chamber 13—that is to say, that if the retaining-valve closes at fifty pounds, train-pipe pressure, it will require as much in addition to fifty pounds to open the retaining-valve as there is in chamber 13. As this usually does not exceed ten or fifteen pounds, the retaining-valve will be raised before the maximum train-pipe pressure is reached.

In the construction of Fig. 6 no pressure can accumulate between the diaphragm and the bushing 10, as the chamber 13 is in open communication with the atmosphere. The brake-cylinder pressure entering chamber 18 affects only the comparatively small area of the valve 15, which will not retard the opening of the retaining-valve to any appreciable extent.

The diaphragm 9 is of concavo-convex form, slightly flattened at the crown. Being of limited diameter, its degree of convexity is made sufficient to permit the closing of the valve 15 without completely reversing the convex side. This reversion of the diaphragm 9 by the abutment 17 is gradual. Beginning in the center, the depression extends concentrically until the valve 15 is seated, when the central part assumes the form shown in Fig. 3 and by the dotted line in Fig. 5. The depth of the concave side of the diaphragm being equal to the travel of the valve 15, it follows that the crown is not depressed below the plane of the circumference. Therefore only a partial reversion of the diaphragm takes place. Thus while in the position when the retaining-valve is closed, Fig. 3, the larger part of the diaphragm will be supported by the under side of the bushing 10, thereby reducing the amount of force to be exerted by the spring 20 in pressing the valve 15 to its seat.

The spring 20 is adjusted to close the retaining-valve at fifty pounds per square inch, train-pipe pressure. Then, when from prolonged applications of the brakes, as in running grades, the train-pipe pressure has been repeatedly lowered to cause the triple-valve to admit pressure from the auxiliary reservoir to the brake-cylinder, and the pressure in the auxiliary reservoir has been reduced below that required to maintain the necessary pressure in the brake-cylinder, air is admitted to the train-pipe to recharge the auxiliary reservoir. The preponderance of pressure on the train-pipe side of the triple-valve piston then moves the triple valve into the release position and recharges the auxiliary reservoir, and, as the retaining-valve 15 closes at fifty pounds per square inch, the release of fluid under pressure from the brake-cylinder, through the triple-valve exhaust-port 22 to the atmosphere, is prevented by the retaining-valve 15, until the full working pressure in the train-pipe is restored. Thus the auxiliary reservoir can be recharged up to the amount at which the retaining-valve is set to raise.

When it is desired to release the brakes, the normal train-pipe pressure is restored. This pressure extends to the chamber 6, and, acting on the diaphragm 9, raises the abutment 17, which lifts the retaining-valve off its seat, and allows the fluid under pressure in the brake-cylinder to pass out from the triple-valve exhaust-port 22 into the annular channel 11, then (in the construction shown by Figs. 2 and 3) through ports 12 and chamber 13, into chamber 18, and from thence into the atmosphere through the port 21.

In Fig. 6, the fluid under pressure from the brake-cylinder enters the chamber 18, between the screw-plug 23 and the bushing 10. From there it passes the valve 15 into the chamber 13, then through the ports 12 into the channel 11, and out into the atmosphere through the port 21.

It will be seen that as the retaining-valve does not close until the train-pipe pressure has been reduced to fifty pounds, it does not interfere with the prompt release of the brakes during ordinary service.

I am aware that prior to my invention pressure-retaining valves have been operated by flexible diaphragms exposed to train-pipe pressure. I therefore do not claim the same, broadly, but the construction of these prior devices is such as to require a separate and distinct body or shell having the necessary communication with the triple valve and other elements of the brake system through pipe connections.

It will be seen that my improved pressure-retaining valve is adapted to be a part of the body or shell of the triple valve, thus making a compact and economically-constructed device having the connections necessary for its operation through the triple valve.

Having fully described my improvement, what I claim as new, and desire to secure by Letters Patent, is—

In an automatic fluid-pressure brake system, a quick-action triple valve provided with a pressure-retaining valve having the combination of chambers in communication with the train-pipe and brake-cylinder respectively, the flexible diaphragm 9, the bushing 10, the valve 15, and means for adjusting the spring-pressure on the valve, substantially as shown and described.

WILLIAM HIRST.

In presence of —
A. R. FOLEY,
HENRY J. NICKLIN.